US006078008A

United States Patent [19]
Wood et al.

[11] Patent Number: 6,078,008
[45] Date of Patent: Jun. 20, 2000

[54] PORTABLE LOAD-BREAKING AND LOAD RETURNING APPARATUS

[75] Inventors: Eugene H. Wood; Michael G. Nolte, both of Hickory; David A. Franklin, Morganton, all of N.C.

[73] Assignee: Utility Solutions, Inc., Hickory, N.C.

[21] Appl. No.: 08/940,566

[22] Filed: Sep. 30, 1997

[51] Int. Cl.[7] .............................. H02G 7/00; H02G 7/20; H01R 17/04

[52] U.S. Cl. ........................ 174/44; 174/40 R; 174/45 R; 174/43; 174/138 R; 200/51 R

[58] Field of Search .................................... 174/44, 40 R, 174/138 R, 137 R, 43, 45 R, 45 TD; 200/51 R, 41 R, 82 R, 83 W

[56] References Cited

U.S. PATENT DOCUMENTS

| | | | |
|---|---|---|---|
| 3,600,784 | 8/1971 | Porpst et al. | 29/747 |
| 4,215,253 | 7/1980 | Tilman | 200/82 R |
| 4,281,228 | 7/1981 | Harmon | 200/51 R |
| 4,645,888 | 2/1987 | Barkan et al. | 200/83 W |
| 5,483,210 | 1/1996 | Otterberg et al. | 335/18 |

*Primary Examiner*—Kristine Kincaid
*Assistant Examiner*—Mark Olds
*Attorney, Agent, or Firm*—Allen, Dyer, Doppelt, Milbrath & Gilchrist, P.A.

[57] ABSTRACT

A load-breaking and load-returning apparatus and method of breaking and returning a load are provided for quickly breaking and returning a load to portions of a power line. The apparatus preferably includes at least one power line jumper cable including first and second cable ends and a first connector connected to the first cable end of the at least one power line jumper cable for connecting the at least one power line jumper cable to a portion of a power line. A load-breaking and load-returning device is preferably connected to the second cable end of the at least one power line jumper cable for quickly breaking and returning a load to portions of a power line responsive to a user thereof. The load-breaking and load-returning device preferably includes a second connector for connecting the load-breaking and load-returning device to a portion of a power line.

18 Claims, 6 Drawing Sheets

PORTABLE LOAD-BREAKING AND LOAD RETURNING APPARATUS

FIELD OF THE INVENTION

The present invention relates to the field of the power distribution servicing and maintenance industries and, more particularly, to an apparatus and method for handling a load associated with a power distribution system.

BACKGROUND OF THE INVENTION

Over the years, power distribution systems have been developed which distribute power from various types of power generation facilities and eventually to end users such as residential and commercial customers. Various regulated power utility companies have been primarily responsible for the power generation facilities and for the power distribution system or network which distributes the power to customers. Because many of these power utility companies have been granted monopoly or monopoly like rights over the years, for example, and because little or no competition previously existed, these utility companies often have been reluctant or quite slow to change. As various power utility companies have become more competitive with each other and as the power utility companies have become more deregulated in more recent years, change in technology has increased.

One of the areas associated with these power utility companies where change has been slow is with the power distribution systems. Power is still primarily distributed from power generation facilities or intermediate power stations to residential and commercial customers by the use of overhead power line networks, e.g., often three-phase power line networks. As used herein, an upstream direction along a power line will generally be in a direction toward a power generation facility or power source, and a downstream direction along a power line will generally be in a direction toward a customer, e.g., residential or commercial, or other user of power.

One recurring problem with these overhead power line networks, for example, is the maintenance and repair associated with ensuring that customers receive power when desired and continuously. Another recurring problem, for example, is the increased risk of injury to service or maintenance workers when working on either the power lines themselves or systems and devices associated with the power lines.

The power line network is conventionally a three-phase power line network, and this description is applicable to each of the three power lines. For simplicity, however, only one of the three power lines is described for this process. To service or repair only a portion of a power line network or system, for example, an upstream switch associated with the power line network needs to be opened, e.g., the switch breaks the downstream load. The opening of the switch causes all customers downstream from the switch to have at least a temporary power loss. Permanent jumper cables connected to a power line pole and to the power lines then need to be cut while the power load is not being transmitted across that portion of the power lines, e.g., the lines are "cold", and then the switch is closed. If the permanent jumper is cut while the full power load is being transmitted across the power lines, e.g., the lines are "hot", then severe arcing and potential increased risk of injury to the workers and surrounding equipment can occur. The power line pole acts like an end node for the network so that power is once again available to those customers downstream from the switch and up to the power line pole where the permanent jumper(s) are cut. Utility workers can then repair or work on the segment of the network downstream from the power line pole where the permanent jumper(s) are cut.

In order to restore power to the repaired or serviced section of the power line network, the upstream switch is again opened causing all of the downstream customers to lose power, and the permanent jumper is reattached to the power line pole connection. The upstream switch is then closed once again restoring power to the downstream customers to both the portion from the switch to the power line pole and to the customers downstream from the power line pole where the service or repair has occurred.

One alternative to the above conventional procedure that has developed is to provide a temporary jumper cable which connects to the power line and extends around the power line pole connected to each of two separate segments or portions of a power line network. The permanent jumper cables can then be cut, and a power line switch positioned upstream from the power line pole can then be opened. The temporary jumper cable can then be removed, and the upstream power line switch can be closed again. Utility workers can then repair or work on the segment of the network downstream from the power line pole where the permanent jumper(s) are cut. This allows cold operation on the segment of the network downstream from the power line pole. The process is reversed to restore power to the repaired segment of the power line. This alternative, however, is not much different than the other conventional approach described above.

Another alternative that has developed is to use temporary load pick-up jumper cables for the operation. In this process, the upstream power line switch is opened causing a loss of power to all of the downstream customers, and the permanent jumper is cut. The upstream switch is then closed, and only the segment of the power line network downstream from the cut permanent jumper is cold. The repair is made, and then the temporary load pick-up jumper cables can be connected to the power lines and extend around the power line pole with the cut permanent jumper while the upstream segment of the network is hot and the downstream segment is cold. This restores power to the segment of the network downstream from the power line pole. The permanent jumper can then be reattached, and then the temporary load pick-up jumper cables removed. Although this approach may be somewhat helpful, all customers downstream from the upstream power line switch still temporarily lose power even though nothing may be wrong with their corresponding segment of the network.

SUMMARY OF THE INVENTION

With the foregoing in mind, the present invention advantageously provides a load-breaking and load-returning apparatus and method for use in association with power lines. The apparatus advantageously provides three separate tool functions, namely load-break, load return, and jumper cable functions. The present invention also advantageously provides a portable apparatus and method for quickly repairing, maintaining, or performing other work on only selected segments of a power line network without the necessity of customers which have nothing wrong with their corresponding segment of the network to lose power, even temporarily, while the segment is being repaired, maintained, or having other work performed. The present invention additionally advantageously provides a load-breaking and load-returning apparatus and method which reduces the number and/or time of utility workers needed to repair or service segments of a power line network. The present invention further advantageously provides an apparatus and method which inhibits or reduces the risk of injury associated with repairing, servicing, or maintaining segments of a power line network.

More particularly, the present invention provides a load-breaking and load-returning apparatus for quickly breaking and returning a load to portions of a power line. The apparatus preferably includes at least one power line jumper cable including first and second cable ends and first connecting means connected to the first cable end of the at least one power line jumper cable for connecting the at least one power line jumper cable to a portion of a power line. Load-breaking and load-returning means, e.g., preferably provided by a load-breaking and load-returning device, is preferably connected to the second cable end of the at least one power line jumper cable for quickly breaking and returning a load to portions of a power line responsive to a user thereof. The load-breaking and load-returning means preferably includes second connecting means for connecting the load-breaking and load-returning means to a portion of a power line.

The present invention also preferably includes a load-breaking and load-returning device for quickly breaking and returning a load to portions of a power line. The device preferably includes a housing for attaching to a portion of a power line and load-break switching means associated with the housing for breakingly switching between an open position which inhibits current from flowing through the housing when attached to the power line and a closed position which readily allows current to flow through the housing when attached to the power line.

The present invention also advantageously includes methods for breaking and restoring power to a portion of a power line network. A method preferably includes providing a load-breaking and a load-returning device being operable between an open position which inhibits current flow therethrough when connected to a power source and a closed position which readily allows current to flow therethrough when connected to the power source and attaching the load-breaking and load-returning device to a portion of a power line when in the open position. The method also preferably includes closing the load-breaking and load-returning device so that current from the portion of the power line readily flows therethrough and opening the load-breaking and load-returning device so that current from the portion of the power line is thereby inhibited from flowing therethrough.

Another method for breaking and restoring power to a portion of a power line network preferably includes providing a load-breaking and a load-returning apparatus being operable between an open position which inhibits current flow therethrough when connected to a power source and a closed position which readily allows current to flow therethrough when connected to the power source. A first end of the load-breaking and load-returning apparatus is preferably attached to a downstream portion of a power line network when in the open position. A second end of the load-breaking and load-returning apparatus is preferably attached to an upstream portion of a power line network when in the open position. The method preferably also includes closing the load-breaking and load-returning apparatus so that current from the power line readily flows therethrough, disconnecting a permanent power line jumper associated with the power line network and positioned between the first and second ends of the load-breaking and load-returning apparatus so that current is thereby inhibited from flowing therethrough to the downstream portion of the power line network, and opening the load-breaking and load-returning apparatus so that current from the power line is thereby inhibited from flowing therethrough to the downstream portion of the power line network.

Yet another method for breaking and restoring power to a portion of a power line network preferably includes providing a load-breaking and a load-returning apparatus being operable between an open position which inhibits current flow therethrough when connected to a power source and a closed position which readily allows current to flow therethrough when connected to the power source. The load-breaking and load-returning apparatus is preferably readily connected to and disconnected from a power line.

Therefore, the load-breaking and load-returning apparatus advantageously includes load-break, load-return or load-pick-up, and jumper capability in one apparatus or utility tool device. The apparatus can be used to rapidly de-energize and re-energize power line segments or portions for repair while minimizing the number and duration of customer power outages. The apparatus also provides flexibility in sizing and voltage uses or classes while still providing simplicity in assembly and usage. Also, because of the design and structural configuration of a load-breaking and load-returning apparatus, by the use of an insulated glove, an apparatus can also be operated during "hot" conditions and yet still inhibit or reduce the risk of injury during these "hot" conditions.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF A PREFERRED EMBODIMENT

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime notation, if and where used, indicates similar elements in alternative embodiments.

Figure 1:
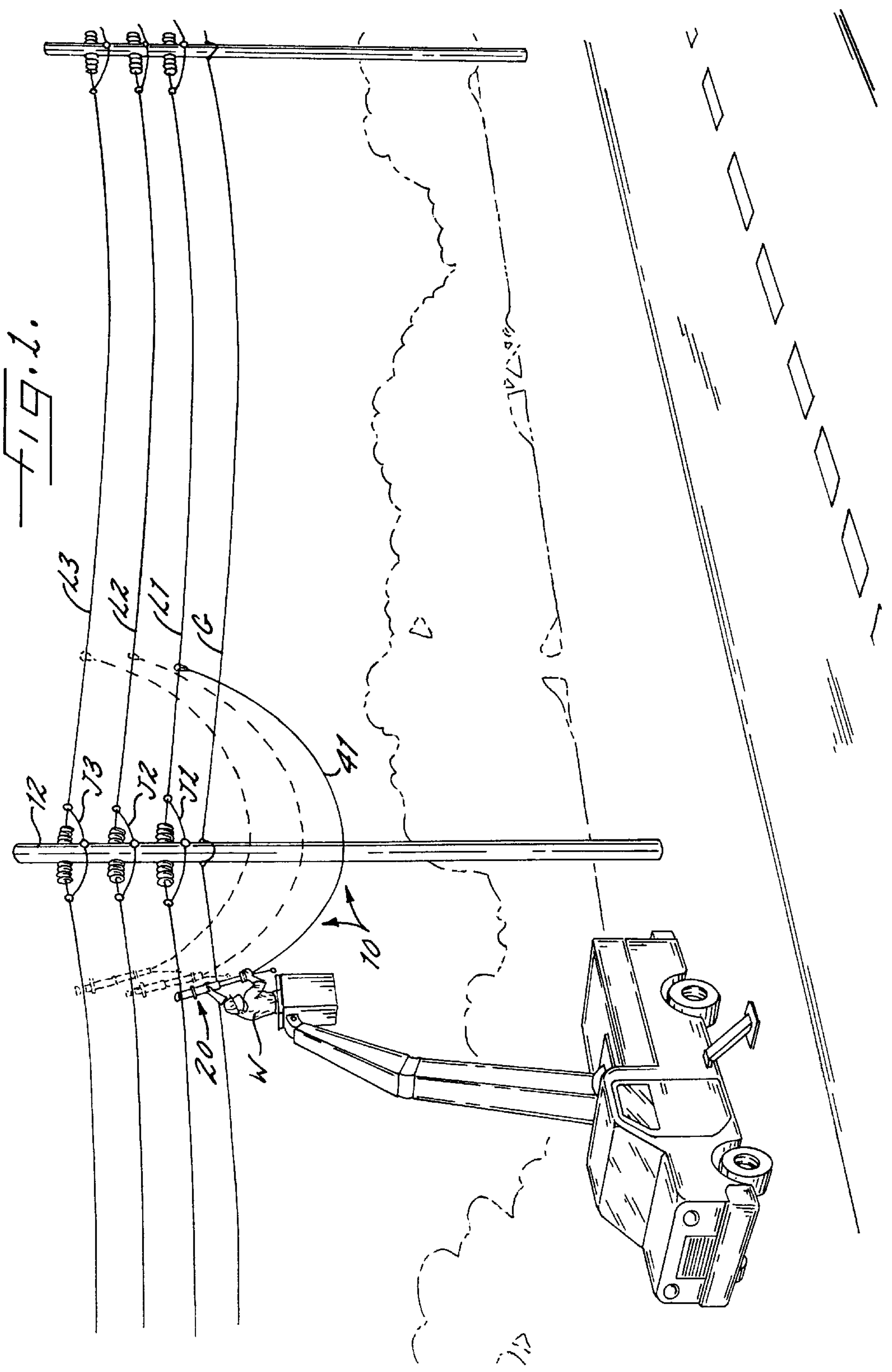
FIG. 1 is an environmental view of a load-breaking and load-returning apparatus being positioned on portions of utility power lines by a utility maintenance worker according to the present invention.
Figures 2, 3:
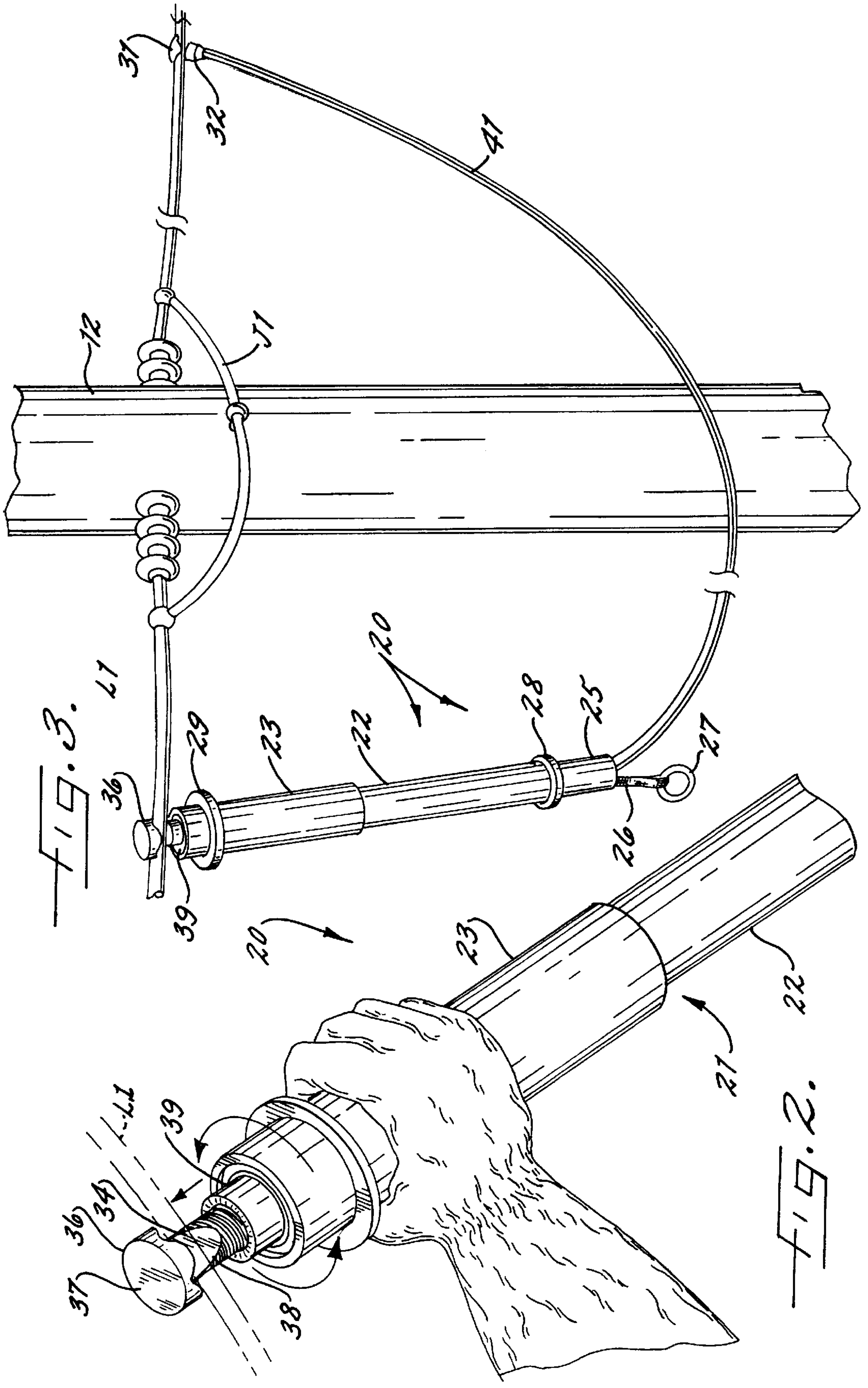
FIG. 2 is a fragmentary perspective view of a load-breaking and load-returning apparatus being positioned on portions of a utility power line by a utility worker according to the present invention.
FIG. 3 is a perspective view of a load-breaking and load-returning apparatus positioned on portions of a utility power line according to the present invention.
Figure 4A:
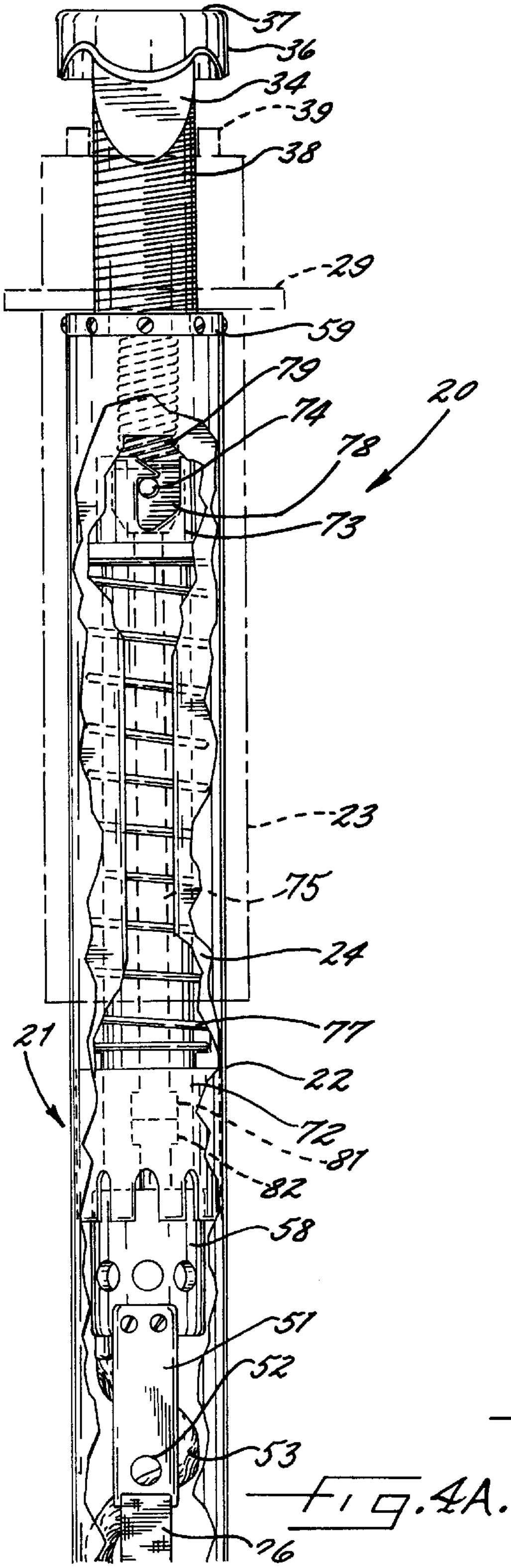
FIG. 4A is a side elevational view of a load-breaking and load-returning apparatus in a closed position and having portions thereof broken away for clarity according to the present invention.
Figure 5A:
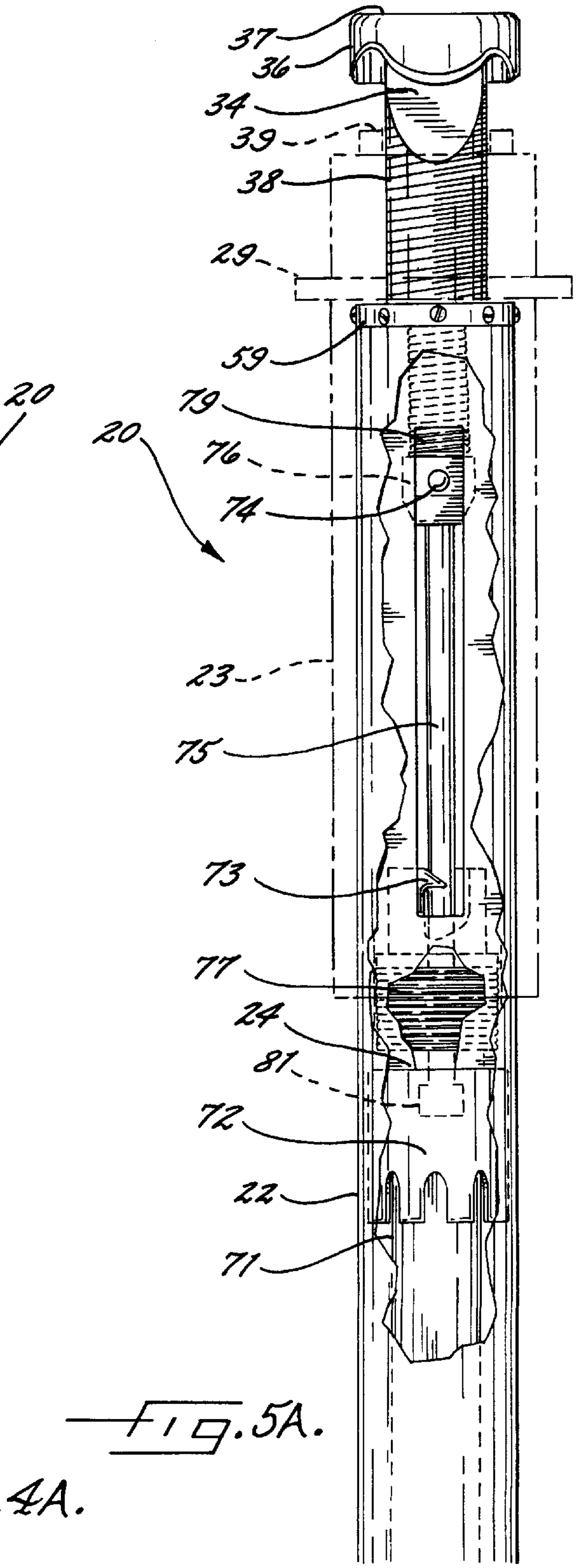
FIG. 5A is a side elevational view of a load-breaking and load-returning apparatus in an open position and having portions thereof broken away for clarity according to the present invention.
Figure 4B:
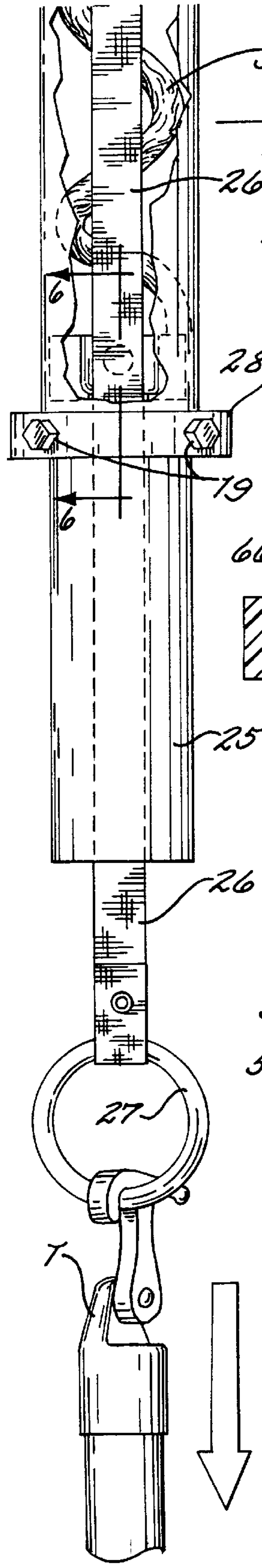
FIG. 4B is a side elevational view of a load-breaking and load-returning apparatus in a closed position and having portions thereof broken away for clarity according to the present invention.
Figure 5B:
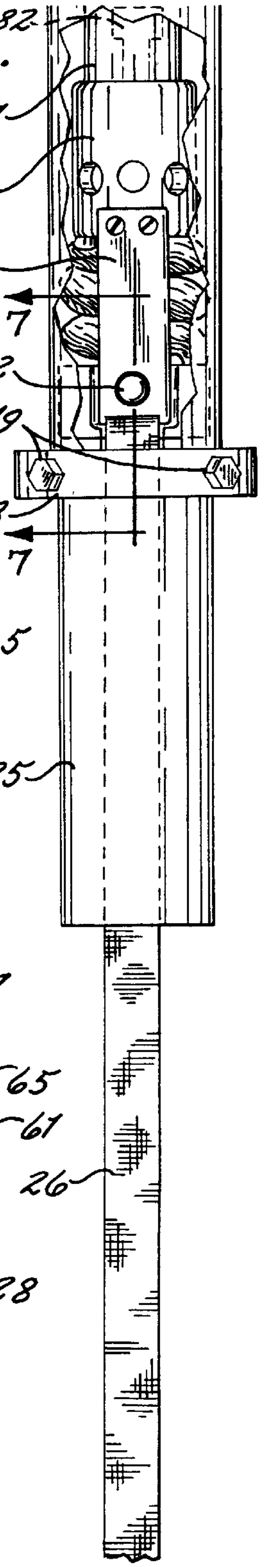
FIG. 5B is a side elevational view of a load-breaking and load-returning apparatus in an open position and having portions thereof broken away for clarity according to the present invention.

FIGS. 1–3 illustrate a portable load-breaking and load-returning apparatus 10 for quickly breaking and returning a load to portions of a power line L1, L2, L3. The apparatus 10 advantageously includes at least one power line jumper cable 41, including first and second cable ends, and first connecting means connected to the first cable end of the at least one power line jumper cable 41 for connecting the power line jumper cable 41 to a portion of a power line L1. The first connecting means is preferably provided by a first connector 32 which adjustably grips to the outer surface of a power line L1 as perhaps best illustrated in FIG. 3. As understood by those skilled in the art, the first connector 32 preferably defines a first clamp which can be adjustably threaded to form a clamping force on a portion of the outer surface of the power line L1.

The apparatus 10 also preferably includes load-breaking and load-returning means connected to the power line jumper cable 41 for quickly breaking and returning a load to portions of a power line L1 responsive to a user thereof. The load-breaking and load-returning means is preferably provided by a separate load-breaking and load-returning device 20 which can readily be connected to and disconnected from the power line jumper cable 41 such as by a threaded opening positioned generally at a lower end of the device. For illustrative purposes only in FIGS. 1 and 3, and for general orientation, the load-breaking and load-returning device 20 has an upper end portion connected to a portion of a power line L1 and a lower end portion connected to the power line jumper cable 41.

The load-breaking and load-returning device 20 preferably includes second connecting means 36 connected to the second end of the power line jumper cable 41 for connecting the load-breaking and load-returning means to a portion of a power line L1. The second connecting means is preferably provided by a second connector 36 which also defines a second clamp. The second clamp, as understood by those skilled in the art, preferably includes a top cap member 37, a threaded clamp body 38 connected to the top cap member 37, and a clamp head 39. The threaded clamp body 38 preferably includes a clamping surface 34, e.g., a cut-away or grooved portion, for clampingly holding the power line L1. The second clamp likewise can be adjustably threaded to form a clamping force on a portion of the outer surface of the power line L1. The clamp head 39 preferably includes an upper hand guard 29 and an outer sleeve 23 which can be manually gripped by a hand of a user to thereby threadingly adjust the clamp to the open or closed positions. As understood by those skilled in the art, other types of power line connectors can be used for the first and second connectors according to the present invention. For example, a clamp applied with a gripping style hotstick or utility tool known as a "shotgun stick" by those skilled in the art, can be used as well.

As perhaps best illustrated in FIGS. 4A–4B, 5A–5B, 8, and 9A–9C, the load-breaking and load-returning means 20 is preferably operative between an open position which inhibits current from flowing through the power line jumper cable 41 and a closed position which readily allows current to flow through the one power line jumper cable 41 to which the device 20 is connected. The load-breaking and load-returning device 20 is preferably provided by a housing 21 and load-break switching means associated with the housing 21 for breakingly switching between the open position which inhibits current from flowing through the housing 21 and the closed position which readily allows current to flow through the housing 21.

The housing 21, for example, preferably has a generally cylindrical and/or tubular shape as illustrated. The housing 21 preferably includes a translucent plastic outer body member 22 and an aluminum or other metal inner body member 24, e.g., a main tube. The outer body member 22 is preferably formed of a clear polycarbonate material to advantageously permit visible indication of load-break operations and to provide high resistance to physical damage. The threaded clamp body 38 of the second clamp or second connector 36 is preferably connected to the inner body member 24 by a plurality of fasteners. The housing 21 also preferably includes a detachable base member (see FIG. 8) which can be readily detached from the outer body member 22 to advantageously make the connection or removal of the power line jumper cable 41 fast and simple. The power line jumper cable 41, for example, can be threadingly attached to the lower end portion of the outer body member 22.

Figure 6:
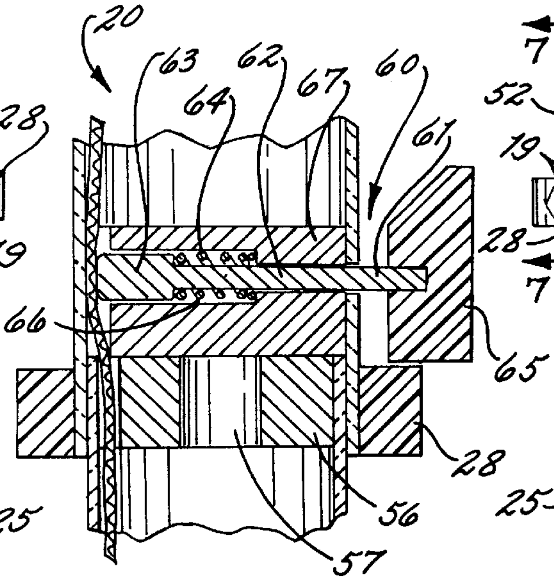
FIG. 6 is a vertical sectional view of a load-breaking and load-returning apparatus taken along line 6—6 of FIG. 4B according to the present invention.
Figure 7:
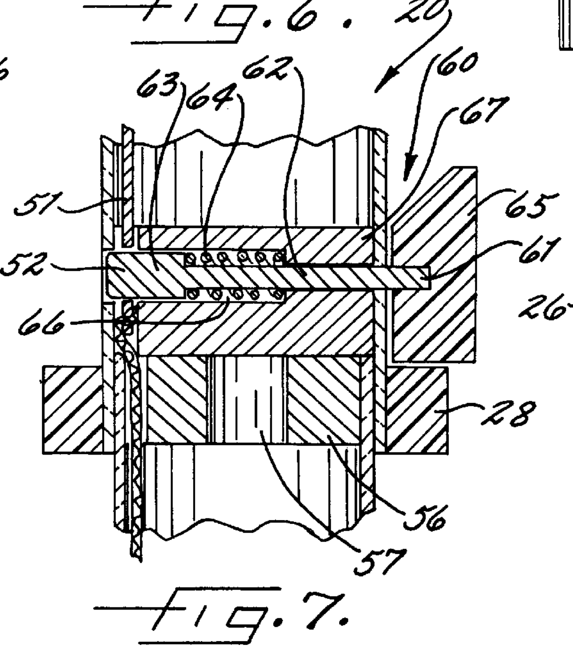
FIG. 7 is a vertical sectional view of a load-breaking and load-returning apparatus taken along line 7—7 of FIG. 5B according to the present invention.
Figure 8:
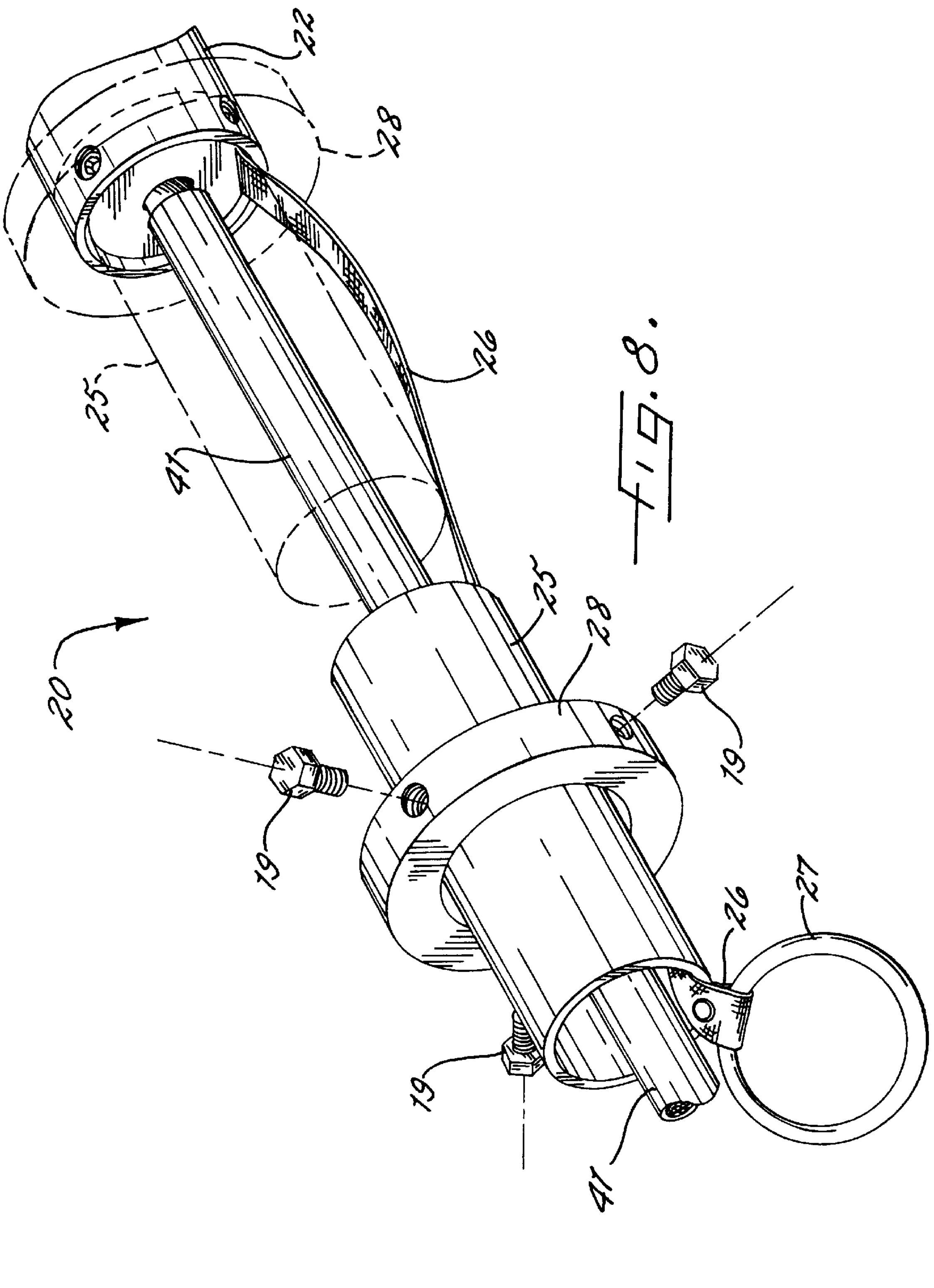
FIG. 8 is an exploded perspective view of a load-breaking and load returning apparatus according to the present invention.

Also, as illustrated in FIGS. 6–7, the load-breaking and load-returning means 20 further includes position locking means 60 for locking the load-breaking and load-returning means 20 in a predetermined one of the open and closed positions. The predetermined position is preferably the open position to thereby inhibit accidental closing of the load-breaking and load-returning means 20. The position locking means 60 preferably includes manual lock releasing means, e.g., preferably provided by a flanged reset button 65 as illustrated, for manually releasing the position locking means 60 from the locked predetermined position by a user thereof.

The position locking means 60 also preferably includes a sealing member 67 and a locking pin 61 cooperating with the sealing member 67 and having a proximal end thereof connected to the flanged reset button 65. The locking pin 61 preferably has a bulbous distal end and an elongate shaft 62 connected to and extending outwardly from the bulbous distal end 63. The shaft 62 preferably slidably extends through a narrow portion of an opening in the sealing member 67 and extends outwardly from the housing 21 of the load-breaking and load-returning device 20 where it is connected to the reset button 65. The bulbous distal end 63 of the locking pin 61 slidably moves within a wider portion 66 of the opening in the sealing member 67. The locking means 60 also includes a biasing member, e.g., a spring 64, which preferably biases the locking pin 61 in a closed position. Only by the manual outward movement of the reset button 65, the locking pin 61 releases from a locked position.

In other words, the position locking means 60, e.g., for the load-breaking function, advantageously resists accidental release. The position locking means 60 can only be released, i.e., activating the load-pickup or load-returning function, by pulling the flanged reset button 65 outwardly. This can be accomplished, for example, by the hand of a user or by pulling down on a beveled side of the reset button with a utility tool T, e.g., a "hotstick", such as commonly used in the utility power distribution industry and as understood by those skilled in the art. This beveled side or beveled portion of the reset button 65 advantageously allows the load pickup or load return function to be triggered remotely by a hotstick.

As illustrated in FIGS. 4A–9C, the construction and further operation of a load-breaking and load-returning apparatus 10 is further described herein. The housing 21 of the load-breaking and load-returning means 20 preferably also includes upper and lower hand guards 28, 29. The upper hand guard 29 is connected to an upper end portion of the housing 21, e.g., as a portion of the clamp head 38, and extends outwardly therefrom. The upper hand guard 29 is preferably provided by a flanged upper ring member. Likewise, the lower hand guard 28 is connected to a lower end portion of the housing 21 and extends outwardly therefrom. The lower hand guard 28 is preferably provided by a flanged lower ring member. The inner surface of the lower ring member slidably engages the outer surface of the outer housing body 22.

The top cap member 37 of the second connector 36, e.g., a clamp, connected to the load-breaking and load-returning device 20 preferably includes a plastic or Vinyl cap which when removed exposes a fastener, e.g., a screw, which fastens the top cap member 37 to the threaded clamp body 38. The rotation of the clamp head body 38 advantageously allows the clamp to be removed from the load-breaking and load-returning device 20. The flanged upper ring member is preferably fastened to the clamp head 38, including the outer sleeve member 23, by a plurality of threaded screws.

The load-break switching means, e.g., preferably provided by a load-break and load-return switch, preferably has major portions thereof positioned within both the outer and inner body members 22, 24. The load-break switching means preferably further includes a main tube bearing connected to the inner body member or main tube 24 and a slotted end member which defines a main female contact 72 which preferably forms a bottom or end member 73 for the main tube or inner body member 24 of the housing 21. The main tube 24 also has a top end member 76 adapted to receive portions of the threaded clamp body 38 (See FIG. 5A). The main tube 24 also preferably has a thin slot or opening which receives a guide button therein and a wide slot 78 which receives a trigger pin 74 therein. A main female contact 72 threadably connects to the main tube 24 and engages a main male contact 58 also preferably connected to the main tube 24.

The load-break switching means also preferably has the main male contact 58 preferably being connected to a cartridge member 71 slidably positioned within the main tube 24 when in the load-return position. The main male contact 58 also abuttingly contacts the main female contact 72 when in the load-returning position. The cartridge member 71 also preferably has at least portions thereof which extend outside of the inner confines of the main tube 24 when in the load-breaking position. As understood by those skilled in the art, the cartridge member 71 preferably includes an arc extinguishing material and a glass or other fiberglass material. The cartridge member 71 preferably includes an inner arcing chamber which is preferably lined with the arc extinguishing material.

The load-break switching means also preferably includes a load-break biasing member, e.g., a load-break spring 79, a male probe assembly 75, and a biasing connector connected to the male probe assembly 75 and the load-break spring 79 each of which are preferably positioned within the inner body member or main tube 24. The load-break spring preferably includes a coil, e.g., preferably formed of copper, A male arcing contact is also connected to the male probe assembly 75. The load-break switching means also preferably includes the female arcing contact, a pair of respective fiberglass and metal arcing shims adapted to be positioned adjacent the cartridge member 71, e.g., preferably tubular shaped.

The fiberglass arcing shim preferably is positioned adjacent the main male contact 58 and is followed by the metal arcing shim. A washer, e.g., a wave spring washer, is positioned adjacent the metal arcing shim. The male probe assembly 75 is then positioned adjacent the washer. The load pickup or return spring 77 is positioned over the main tube 24. The main tube bearing is positioned on the slotted end member, and the slotted end member is preferably threadably connected to the main tube 24.

A flexible coil member 53, e.g., preferably formed of copper and generally being braided, has one end thereof connected to the main male contact 58 by a plurality of fasteners, and a bottom connector, e.g., preferably formed of an aluminum or other metal material, is connected to the other end of the flexible coil member 53 by a plurality of fasteners. The flexible coil member 53 preferably flexes and carries the load during motion of the device 20. The bottom connector preferably includes two portions. A first upper portion defines the sealing member 67 of the locking means 60. A second lower portion 56 is connected to the first upper portion, is adapted to have the power line jumper cable 41 be threadably connected thereto through an opening 57 formed therein, and generally forms a bottom for the outer tubular body member 22 of the housing 21.

For activation of the load-breaking function, the load-break switching means also preferably includes a plate member 51 connected to the main male contact 58 and an insulated activation strap 26 having a distal end thereof connected to the plate member 51. The activation strap 26 is preferably formed of a high-strength nylon or other flexible non-conducting material and preferably has a pull ring 27, e.g., metallic, connected to a proximal end thereof. As illustrated, the pull ring 27 preferably extends downwardly beyond the base member 25 of the housing 21 when attached to a portion of a power line L1. The pull ring is preferably engageable by a hotstick T or other manual activation device so that the load-breaking and load-returning apparatus 10 can be activated when positioned overhead on a power line L1, L2, L3. As the load-breaking function is initiated by pulling down on the strap, the apparatus 10 uses the insulated activation strap 26 because the energized circuitry is moving toward the base of the device 20 and closer to the operator.

The load-break circuit path preferably includes the main male and female current carrying contacts 58, 72 which are preferably brass contacts. These contacts 58, 72 are preferably designed to carry the current, e.g., 300 amperes, continuously without thermal runaway. Once separated, the main male and female contacts 58, 72 stop carrying the current. At the moment of separation, no arc will be drawn as the contacts 58, 72 separate. The male arcing contact 81 and the female arcing contact 82 within the housing 21 form a parallel current path and carry current as well. These arc contacts carry all of the current after the main male and female contacts 58, 72 separate. During separation, the trigger pin 74 pulled along by the flat on the main tube end 73. The trigger pin 74 acts to keep the male probe assembly 75 in-place during the entire load-break stroke.

As the device 20 extends, the load break spring 79 is being extended almost exactly the same amount as the device 20 is being extended. Once the device 20 extends almost to the end of the stroke, the trigger pin 74 strikes the angled cut 78 of the end member or main tube end 73. The angle forces the trigger pin 74 to rotate and slide off of the flat of the main tube end 73 and activate the load-breaking operation.

The trigger pin 74 should be kept in-place until maximum extension of the device 20 occurs. The timing is important so that every time the device 20 triggers, the device 20 locks open. The trigger pin 74 preferably does not slide off too early or the device 20 will trigger the load-break function and not lock in the open position. If this occurs, the tool will immediately perform the load pick-up operation and reconnect the power.

Although the silver tungsten used with the male and female arcing contacts 81,82 has a high electrical resistance, during a load-break function the load is preferably diverted through the contacts only for a short time duration. When used with a jumper cable 41, however, a continuous high electrical load will be seen. Accordingly, the apparatus 10 also preferably advantageously includes a parallel and low resistance electrical path to overcome problems which can be predicted with the use of the jumper cable 41. As a load-break operation is initiated, the parallel low resistance electrical path is first broken and responsively causes the apparatus 10 to function as a load-break tool or device (see also FIGS. 9A–9C).

The locking pin 61 of the locking means 60 preferably locks into place when the strap 26 is pulled downward so that the flexible coil 53 is in a collapsed or retracted position. The locking pin 61 preferably slidably engages an opening or slot 52 formed in the plate member 51 connected to the main male contact 58. The manual release of the reset button 65 disengages the locking pin 61 from the opening or slot 52 in the plate member 51 so that the flexible coil 53 returns to the extended position.

The plate member 51 and locking pin 61 are coordinated such that the locking pin 61 is forced into place at just the right time, i.e., just after the device 20 performs the load-break operation. Once the trigger pin 74 is forced off the flat, the load-break spring 79 is fully extended—it is an extension spring—and begins to retract very rapidly. This separates the male and female arcing contacts 81,82. The arcing contacts preferably are tipped with silver tungsten to withstand the arcing. The separation draws the arc between the arc extinguishing plastics which quench the arc, preferably within one (1) cycle and more preferably within one-half (½) cycle.

A plastic ring or stop gasket (not shown) is on the male probe shaft and operates as a stop to keep the male arcing contact 81 within the cartridge tube 71 so that all arcing is contained within the arcing chamber thereof. This keeps debris caused by arcing contained and keeps the device 20 clean. Once the load is broken, the device 20 has created a break in the power line L1, and all current flow and voltage are reduced to zero. The utility worker or lineman preferably has three load-breaking and load-returning devices 20 positioned on the power lines L1, L2, L3 in rapid succession to avoid running fewer than three phases.

For load-return or load pick-up operation, the load pick-up spring 77 is used as the stop for the load-break operation. The load pick-up spring 77 is preferably sized so that when it is fully compressed (FIG. 5A), it is actually the physical stop for the main tube 24. This advantageously ensures that the spring 77 is fully compressed and ready for load pickup operation. Because the load pick-up spring 77 has been fully compressed, e.g., a compression spring, it is a predictable and repeatable position.

Preferably, the only portion holding the device 20 in the open position is the locking pin 61 through the plate member 51 which is secured to the main male contact 58. The locking pin 61 only needs to be pulled outwardly to release the device 20 to perform the load pick-up operation. The reset button 65 is preferably designed to be operated with a conventional disconnect head of a tool T. The head slides down into the bevel on the reset button 65, and the combination of the lateral force from the disconnect head against the bevel and bottom of the button 65. Striking the bottom flange 28 forces the reset button 65 to an out or outward position and releases the device 20 to perform the load pick-up operation The male and female arcing contacts 81,82 then come into contact and begin to carry the load. During the load pick-up operation, arcing does occur between the contacts 81,82 prior to actual contacts between the metal parts. This arcing causes minor damage during every operation and preferably needs maintenance over the long term. Because of the simplicity of the device, e.g., construction and set-up, this maintenance advantageously can easily and readily be accomplished. This design preferably has the ability for the male arcing contact 81 to come into contact with the female arcing contact 82 prior to the main male and female current carrying contacts 58,72 coming together. This forces the minor arcing to occur between the silver tungsten tipped arcing contacts 81,82 which will not be damaged by such minor arcing, e.g., silver plated brass has little or no arcing resistance.

The trigger pin 74 strikes the angled edge of the ain tube end 73 and is forced to rotate around the flat. The angled edge 78 of the main tube end 73 forces the trigger pin 74 back onto the flat. This resets the device 20 automatically for the next load-break operation.

Figure 9C:
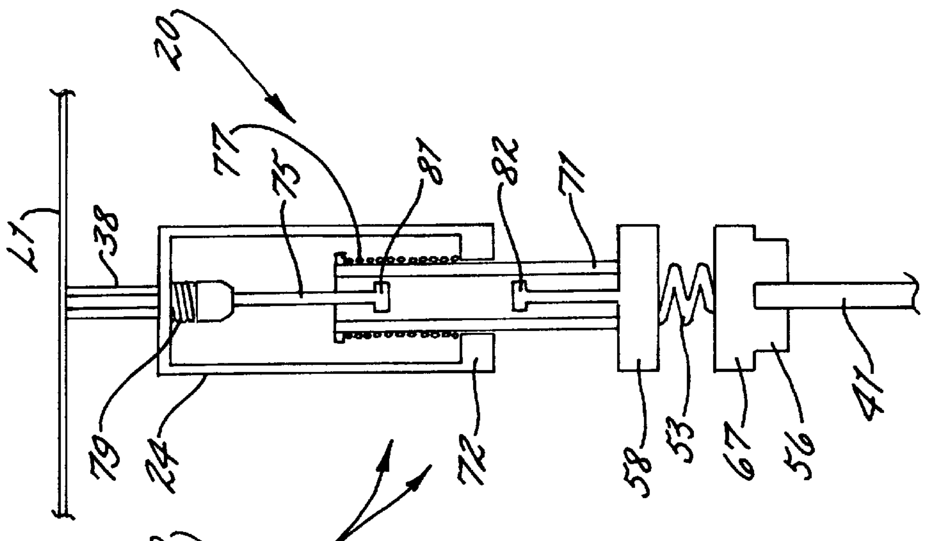
FIGS. 9A–9C are schematic circuit path block diagrams of the respective closed, partially opened, and opened positions of a load-breaking and load returning apparatus according to the present invention.
Figure 9B:
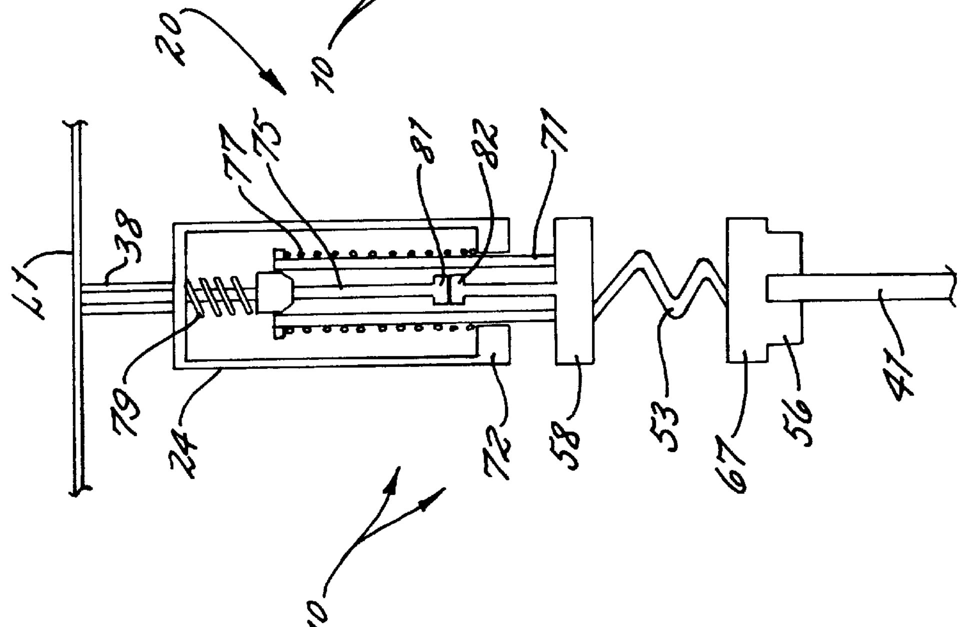
Figure 9A:
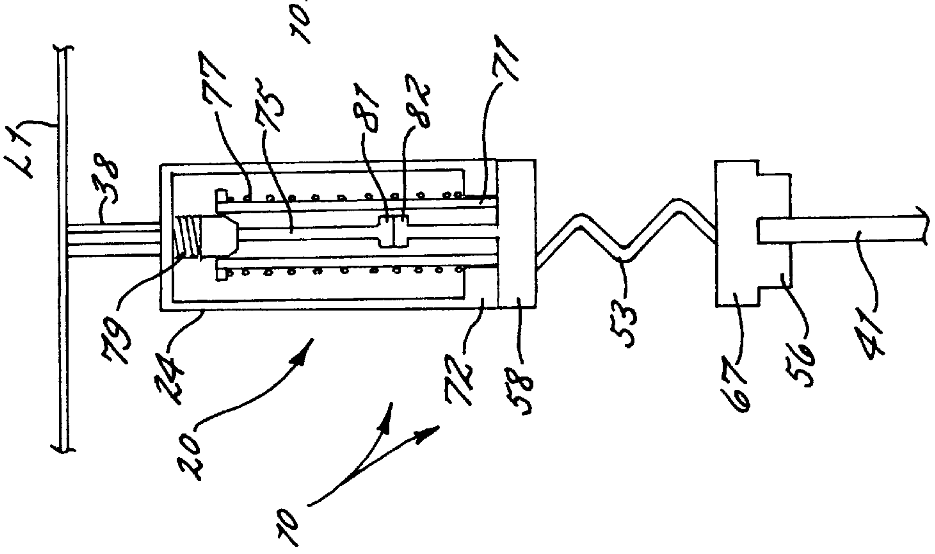

FIGS. 9A–9C schematically illustrate the circuit path of a load-break and load-return switching means of a load-breaking and load-returning apparatus 10 when connected to a portion of a power line L1 as described above. In the closed position (FIG. 9A), the apparatus 10 advantageously preferably includes parallel low resistant and high resistance current paths as illustrated. The low resistance path preferably extends from the power line L1 to the threaded clamp head 38 (see also FIG. 4A) and to the main aluminum inner body member 24 of the housing 21 (see also FIG 4A). From the inner body member, the circuit path continues to the main female contact 72 (see also FIGS 4A and 5A) and to the main male contact 58 (see also FIGS. 4A and 5B), e.g., preferably formed of brass or silver plated, and then to the flexible coil 53 (see also FIG. 4A). The circuit path further continues to the bottom portion of the aluminum housing, to the jumper cable 41 (see also FIG. 8), to the first connector or first clamp, and back to the power line Li. A concurrent or parallel high resistance circuit path with the low resistance circuit path starts at the threaded clamp head 38 (see also FIG. 4A) and extends to a copper coil 53 positioned within the load break spring 79 (see also FIGS. 4A and 5A) and to the male probe assembly 75. This path continues to the male arcing contact 81, to the female arcing contact 82, to the main male contact 58, and back again to the flexible coil 53 as illustrated.

Once the tool is initially or partially opened (FIG. 9B), the low resistance path is first opened. Once the main male and female contacts 58,72 separate, e.g., about one inch of travel, only the high resistance current path remains closed. Once the load-breaking and load-returning device 20 is fully extended, e.g., fully extends the load-break spring, the male and female arcing contacts 81,82 separate and the load is broken. In the opened position (FIG. 9C), as understood by those skilled in the art, no closed or complete current path exists or is available.

As illustrated in FIGS. 1–9C, the present invention also advantageously includes methods for breaking and restoring power to a portion of a power line network. A method preferably includes providing a load-breaking and a load-returning device 20 being operable between an open position which inhibits current flow therethrough when connected to a power source and a closed position which readily allows current to flow therethrough when connected to the power source and attaching the load-breaking and load-returning device 20 to a portion of a power line L1 when in the open position. The method also preferably includes closing the load-breaking and load-returning device 20 so that current from the portion of the power line L1 readily flows therethrough and opening the load-breaking and load-returning device 20 so that current from the portion of the power line L1 is thereby inhibited from flowing therethrough.

This method can also advantageously include performing an operation on the power line L1 when the load-breaking and load-returning device 20 is connected to the portion of the power line L1 and is in the open position. The load-breaking and load-returning device 20 can also then be closed so that current readily flows therethrough. The load-breaking and load-returning device 20 can further be opened so that current is thereby inhibited from flowing therethrough and the load-breaking and load-returning device 20 removed from the portion of the power line L1.

Another method for breaking and restoring power to a portion of a power line network preferably includes providing a load-breaking and a load-returning 10 apparatus 10 being operable between an open position which inhibits current flow therethrough when connected to a power source and a closed position which readily allows current to flow therethrough when connected to the power source. A first end of the load-breaking and load-returning apparatus 10 is preferably attached to a downstream portion of a power line network when in the open position. A second end of the load-breaking and load-returning apparatus 10 is preferably attached to an upstream portion of a power line network when in the open position. The method preferably also includes closing the load-breaking and load-returning apparatus so that current from the power line readily flows therethrough, disconnecting a permanent power line jumper J1, J2, J3 associated with the power line network and positioned between the first and second ends of the load-breaking and load-returning apparatus 10 so that current is thereby inhibited from flowing therethrough to the downstream portion of the power line network, and opening the load-breaking and load-returning apparatus 10 so that current from the power line L1 is thereby inhibited from flowing therethrough to the downstream portion of the power line network.

This method can also advantageously include performing an operation on the downstream portion of the power line L1 when the load-breaking and load-returning apparatus 10 is connected to the power line L1 and is in the open position and closing the load-breaking and load-returning apparatus 10 so that current readily flows therethrough to the downstream portion of the power line network. The permanent jumper J1 can then be connected so that current readily flows therethrough to the downstream portion of the power line network. The load-breaking and load-returning apparatus 10 can be opened so that current is thereby inhibited from flowing therethrough, and the first and second ends of the load-breaking and load-returning apparatus 10 can be removed from the power line L1.

Yet another method for breaking and restoring power to a portion of a power line network preferably includes providing a load-breaking and a load-returning apparatus 10 being operable between an open position which inhibits current flow therethrough when connected to a power source and a closed position which readily allows current to flow therethrough when connected to the power source. The load-breaking and load-returning apparatus 10 is preferably readily connected to and disconnected from a power line L1.

This method can also advantageously include performing an operation on the power line L1 when the load-breaking and load-returning apparatus 10 is connected to the power line L1 and is in the open position. The load-breaking and load-returning apparatus 10 can then be closed when connected to the power line L1 so that current readily flows therethrough. The load-breaking and load-returning apparatus 10 can also be opened so that current is thereby inhibited from flowing therethrough and removing the load-breaking and load-returning device 20 from the portion of the power line L1.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A load-breaking and load-returning apparatus for quickly breaking and returning a load to portions of a power line, the apparatus comprising:

at least one power line jumper cable including first and second cable ends;

first connecting means connected to the first cable end of said at least one power line jumper cable for connecting said at least one power line jumper cable to a portion of a power line; and load-breaking and load-returning means connected to said at least one power line jumper cable for quickly breaking and returning a load to portions of a power line responsive to a user thereof, said load-breaking and load-returning means including a housing, load-break switching means associated with said housing for breakingly switching between the open position which inhibits current from flowing through the housing and the closed position which readily allows current to flow through said housing, said load-break switching means including a pair of parallel circuit paths, position locking means for locking said load-breaking and load-returning means in an open position to thereby inhibit accidental closing of said load-breaking and load-returning means, and second connecting means connected to the second end of said at least one power line jumper cable for connecting said load-breaking and load-returning means to a portion of a power line.

2. A load-breaking and load-returning apparatus as defined in claim 1, wherein said load-breaking and load-returning means is operative between an open position which inhibits current from flowing through said at least one power line jumper cable and a closed position which readily allows current to flow through said at least one power line jumper cable.

3. A load-breaking and load-returning apparatus as defined in claim 1, wherein said locking means includes manual lock releasing means for manually releasing said locking means from the locked predetermined position by a user thereof.

4. A load-breaking and load-returning apparatus as defined in claim 1, wherein the pair of parallel circuit paths include a low resistance circuit path and a high resistance circuit path.

5. A load-breaking and load-returning apparatus as defined in claim 4, wherein said load-breaking switching means has a cartridge member including arc extinguishing material.

6. A load-breaking and load-returning apparatus as defined in claim 4, wherein said load-break switching means includes a load-break biasing member for biasing said load-break switching means in the open load-break position and a load-return biasing member for biasing said load-break switching means in the closed load-return position.

7. A load-breaking and load-returning apparatus as defined in claim 4, wherein said housing includes an outer body member and a base member detachably connected to said outer body member for readily attaching and detaching said at least one power line jumper cable to said load-breaking and load-returning means.

8. A load-breaking and load-returning apparatus for quickly breaking and returning a load to portions of a power line, the apparatus comprising:

at least one power line jumper cable;

at least one connector connected to said at least one power line jumper cable for connecting said at least one power line jumper cable to a portion of a power line; and a load-breaking and load-returning device connected to said at least one power line jumper cable for quickly breaking and returning a load to portions of a power line responsive to a user thereof, said load-breaking and load-returning device being operative between an open position which inhibits current from flowing through said at least one power line jumper cable and a closed position which readily allows current to flow through said at least one power line jumper cable, said load-breaking and load-returning device including a housing and load-break switching means associated with said housing for breakingly switching between the open position which inhibits current from flowing through the housing and the closed position which readily allows current to flow through said housing, said load-break switching means including parallel switching circuit paths, the parallel switching circuit paths including a low resistance circuit path and a high resistance circuit path.

9. A load-breaking and load-returning apparatus as defined in claim 8, wherein said load-breaking and load-returning device further includes position locking means for locking said load-breaking and load-returning device in a predetermined one of the open and closed positions.

10. A load-breaking and load-returning apparatus as defined in claim 9, wherein the predetermined position comprises the open position to thereby inhibit accidental closing of said load-breaking and load-returning device.

11. A load-breaking and load-returning apparatus as defined in claim 10, wherein said locking means includes manual lock releasing means for manually releasing said locking means from the locked predetermined position by a user thereof.

12. A load-breaking and load-returning apparatus as defined in claim 8, wherein said load-breaking switching means has a cartridge member including arc extinguishing material.

13. A load-breaking and load-returning apparatus as defined in claim 12, wherein said load-break switching means includes a load-break biasing member for biasing said load-break switching means in the open load-break position and a load-return biasing member for biasing said load-break switching means in the closed load-return position.

14. A load-breaking and load-returning apparatus as defined in claim 8, wherein said housing includes an outer body member and a base member detachably connected to said outer body member for readily attaching and detaching said at least one power line jumper cable to said load-breaking and load-returning means.

15. A load-breaking and load-returning device for quickly breaking and returning a load to portions of a power line, the device comprising:

a housing for attaching to a portion of a power line; and load-break switching means associated with said housing for breakingly switching between an open position which inhibits current from flowing through said housing when attached to the power line and a closed position which readily allows current to flow through said housing when attached to the power line, said load-break switching means including a relatively high electrical resistant path and a parallel low electrical resistant path.

16. A load-breaking and load-returning device as defined in claim 15, wherein said load-breaking switching means has a cartridge member including arc extinguishing material.

17. A load-breaking and load-returning device as defined in claim 15, wherein said load-break switching means includes a load-break biasing member for biasing said load-break switching means in the open load-break position and a load-return biasing member for biasing said load-break switching means in the closed load-return position.

18. A load-breaking and load-returning device as defined in claim 15, wherein said housing includes an outer body member and a base member detachably connected to said outer body member for readily attaching and detaching said at least one power line jumper cable to said load-breaking and load-returning means.

* * * * *